(12) United States Patent
Ried et al.

(10) Patent No.: US 10,994,276 B2
(45) Date of Patent: May 4, 2021

(54) TEMPERATURE CONTROL DEVICE, USE AND ARRANGEMENT

(71) Applicant: SARTORIUS STEDIM BIOTECH GMBH, Göttingen (DE)

(72) Inventors: Reinhold Ried, Melsungen (DE); Wei Gao, Kassel (DE); Johannes Koch, Bebra (DE)

(73) Assignee: Sartorius Stedim Biotech GmbH

( * ) Notice: Subject to any disclaimer, the term of this patent is extended or adjusted under 35 U.S.C. 154(b) by 80 days.

(21) Appl. No.: 14/906,303

(22) PCT Filed: Apr. 4, 2014

(86) PCT No.: PCT/EP2014/000906
§ 371 (c)(1),
(2) Date: Jan. 20, 2016

(87) PCT Pub. No.: WO2015/014417
PCT Pub. Date: Feb. 5, 2015

(65) Prior Publication Data
US 2016/0184827 A1    Jun. 30, 2016

(30) Foreign Application Priority Data

Jul. 31, 2013  (DE) .................... 10 2013 012 759.9

(51) Int. Cl.
*B01L 7/00*   (2006.01)
*F28D 1/06*   (2006.01)
(Continued)

(52) U.S. Cl.
CPC .................. *B01L 7/00* (2013.01); *B01L 7/04* (2013.01); *F16L 53/38* (2018.01); *F25B 21/04* (2013.01);
(Continued)

(58) Field of Classification Search
CPC .. F28F 1/06; F28F 21/06; F28F 21/062; F28F 2255/02; F25D 31/005; F25D 31/006;
(Continued)

(56) References Cited

U.S. PATENT DOCUMENTS 2,087,656 A * 7/1937 Rice ......................... C07F 7/24
                                                              556/70
2,625,804 A * 1/1953 Patch ................... B67D 1/0857
                                                           165/104.31
(Continued)

FOREIGN PATENT DOCUMENTS

GB           505943 A  *  5/1939  ............... F28D 1/06
GB    1 595 916             8/1981
(Continued)

OTHER PUBLICATIONS

International Prelimnary Report on Patentability dated Feb. 2, 2016.
(Continued)

*Primary Examiner* — Joel M Attey
*Assistant Examiner* — For K Ling
(74) *Attorney, Agent, or Firm* — Gerald E. Hespos; Michael J. Porco; Matthew T. Hespos (57) ABSTRACT

One aspect of the invention relates to a temperature control device for controlling the temperature of a container, comprising: at least one heating region having at least on heating element, and at least one cooling region having at least one cooling element, wherein the temperature control device is formed to be flexible, at least in some regions, wherein the temperature control device can be transferred from an open position to an arrangement position by flexible deformation, and wherein the temperature control device, in the arrangement position, can be arranged on a wall of the container in a form-fitting manner, at least in some regions, and can be thermally contacted such that the temperature of the con-
(Continued)

tainer can be controlled by means of the at least one heating element and the at least one cooling element.

13 Claims, 5 Drawing Sheets

(51) Int. Cl.
    *B01L 7/04*     (2010.01)
    *F25D 31/00*     (2006.01)
    *F16L 53/38*     (2018.01)
    *F25B 21/04*     (2006.01)

(52) U.S. Cl.
    CPC ............ *F25D 31/005* (2013.01); *F28D 1/06* (2013.01); *B01L 2200/023* (2013.01); *B01L 2200/025* (2013.01); *B01L 2300/123* (2013.01); *B01L 2300/1805* (2013.01); *B01L 2300/1822* (2013.01); *B01L 2300/1838* (2013.01); *B01L 2300/1894* (2013.01); *F25D 31/007* (2013.01); *F25D 2700/16* (2013.01); *F28F 2255/02* (2013.01)

(58) Field of Classification Search
    CPC ............... F28D 1/06; F28D 1/0213; B01J 2219/00495; B01J 2219/2409; B01J 2219/2411; B01J 2219/2413; B01J 2219/2414; B01J 2219/2416; B01J 2219/00494; B01J 2219/00108; B01J 2219/00094; C02F 3/1247; C02F 3/2893; B01L 7/00; B01L 7/04
    USPC .......................................................... 165/46
    See application file for complete search history.

(56) References Cited

U.S. PATENT DOCUMENTS

| | | | | | |
|---|---|---|---|---|---|
| 3,109,832 | A | * | 11/1963 | Seiner | C08G 63/785 526/65 |
| 3,224,501 | A | * | 12/1965 | Burdick | F16L 59/14 165/81 |
| 3,275,809 | A | * | 9/1966 | Tolin | B01J 19/0006 165/11.1 |
| 3,316,064 | A | * | 4/1967 | Kuzuoka | B01J 19/0013 422/134 |
| 3,882,873 | A | * | 5/1975 | Arango | A61F 7/02 165/46 |
| 3,933,200 | A | * | 1/1976 | Cunningham | F28D 1/06 165/64 |
| 3,977,936 | A | * | 8/1976 | Murakami | B01D 1/225 159/49 |
| 4,132,262 | A | * | 1/1979 | Wibell | A47G 9/0215 165/206 |
| 4,206,805 | A | * | 6/1980 | Beckett | F04B 39/06 165/169 |
| 4,213,498 | A | * | 7/1980 | Vandenbossche | F28D 1/06 165/136 |
| 4,241,466 | A | * | 12/1980 | Mendyk | A47G 9/02 5/494 |
| 4,315,416 | A | * | 2/1982 | Frey | F28D 1/06 62/438 |
| 4,529,576 | A | * | 7/1985 | Sancier | B01J 19/26 136/261 |
| 5,150,831 | A | * | 9/1992 | Jordan | B01J 3/002 228/183 |
| 5,363,907 | A | | 11/1994 | Dunning et al. | |
| 5,377,495 | A | * | 1/1995 | Daigle | F25B 45/00 165/46 |
| 5,714,738 | A | | 2/1998 | Hauschulz et al. | |
| 5,755,275 | A | * | 5/1998 | Rose | A61F 7/02 165/171 |
| 5,827,050 | A | * | 10/1998 | Price | F17C 7/00 417/207 |
| 5,851,507 | A | * | 12/1998 | Pirzada | B01J 12/005 423/659 |
| 5,974,820 | A | * | 11/1999 | Boyd | B65D 81/3886 219/529 |
| 5,974,824 | A | * | 11/1999 | Galockin | B67D 1/0864 222/146.6 |
| 6,082,114 | A | * | 7/2000 | Leonoff | A47J 31/005 62/3.64 |
| 6,615,914 | B1 | * | 9/2003 | Young | B01B 1/005 165/263 |
| 7,802,614 | B2 | * | 9/2010 | Elnar | H02K 9/19 165/46 |
| 7,823,625 | B2 | * | 11/2010 | Gammons | F16L 37/0841 165/46 |
| 2005/0161205 | A1 | * | 7/2005 | Ashe | F28D 1/06 165/168 |
| 2006/0016579 | A1 | | 1/2006 | Bonner et al. | |
| 2008/0247939 | A1 | * | 10/2008 | Iyuke | B82Y 30/00 423/447.3 |
| 2009/0294095 | A1 | * | 12/2009 | Brummitt | E02D 3/11 165/45 |
| 2011/0073274 | A1 | * | 3/2011 | Brummitt | F28D 1/035 165/45 |
| 2011/0152982 | A1 | * | 6/2011 | Richardson | A61F 7/02 607/104 |
| 2011/0209578 | A1 | * | 9/2011 | Ara | B01J 4/002 75/345 |
| 2012/0149944 | A1 | * | 6/2012 | Zmierczak | B01J 8/22 568/698 |

FOREIGN PATENT DOCUMENTS

JP           58202035 A   * 11/1983   ............. B01J 14/00
WO     WO-9958920 A1 * 11/1999   ................ F28F 3/14

OTHER PUBLICATIONS

International Search Report.
European Office Action dated Jul. 1, 2019.

* cited by examiner

TEMPERATURE CONTROL DEVICE, USE AND ARRANGEMENT

BACKGROUND

1. Field of the Invention

The invention relates to a temperature control device for controlling the temperature of a container, a use of the temperature control device, and an arrangement comprising the temperature control device.

2. Description of the Related Art.

A container within the meaning of the present application is a volume at least partially enclosed by a wall wherein the wall is formed such that a fluid is retained in the container by means of said wall. This means that the wall of the container is fluid-tight. A fluid within the meaning of the present application is a liquid, a gas, and a mixture thereof. The container per se may have at least one opening through which the fluid may leave or enter the container. In other words, the container per se does not need to be formed fluid-tight. The container is fluid-tight, at least in some regions, because the wall thereof is formed such that the fluid can be retained inside the container.

A temperature control device within the meaning of the present application is a device by means of which the container, in particular the fluid inside the container, can be brought to a predetermined temperature and kept at said temperature. In other words, the temperature control device serves for controlling the temperature of the container, or of the fluid inside the container, respectively. In this respect, controlling the temperature may include both, heating and cooling. In particular controlling the temperature may include heating of the fluid inside the container to a temperature exceeding the ambient temperature of the container. Equivalently, controlling the temperature may also include cooling the fluid inside the container to a temperature below the ambient temperature of the container.

In particular where chemical, biological and/or medical applications or reactions are concerned, it is import that a fluid, such as a culture medium inside the container, such as a bio-reactor is brought to and kept at a predetermined temperature. Depending on the ambient temperature, either heating or cooling of the container is required to this end. For this purpose, heating and cooling elements can be employed extending into the container and contacting the fluid inside the container. In case the container is an aseptic container, controlling the temperature of the fluid inside the container advantageously is performed via the wall of the container.

In view of the above, it is an object of the invention to provide a temperature control device suited for controlling the temperature of a container to a predetermined temperature in an easy and reliable manner.

SUMMARY

One aspect of the invention relates to a temperature control device for controlling the temperature of a container, comprising:
  at least one heating region having at least on heating element, and
  at least one cooling region having at least one cooling element,
wherein the temperature control device is formed to be flexible, at least in some regions, wherein the temperature control device can be transferred from an open position to an arrangement position by flexible deformation, and wherein the temperature control device, in the arrangement position, can be arranged and thermally contacted on a wall of the container in a form-fitting manner, at least in some regions, such that the temperature of the container can be controlled by means of the at least one heating element and the at least one cooling element.

A thermal contact within the meaning of the present invention means that a heat flow, i.e. transport of heat energy is possible between the container and the heating region or the cooling region. Advantageously, the container thermally contacting the temperature control device in the arrangement position can be heated through the heating region and cooled through the cooling region. Thereby, the inside of the container, or the fluid in the container, can be brought to, or kept at a predetermined temperature falling below or exceeding the ambient temperature of the container. In other words, the container can be kept a constant desired temperature. In this respect, deviation of the actual temperature from the desired temperature can be kept smaller than about 5° C., preferably smaller than about 2° C., and in particular smaller than about 1° C. or smaller than about 0.5° C. Thus in particular bio-chemical reactions can advantageously take place inside the container under controlled temperature conditions, preferably at a temperature of about 37° C.

The at least one heating region has at least one heating element. It shall be understood that one of the heating regions may also have two, three, four, five, six, seven, eight, nine, ten or more heating elements. A plurality of heating elements can form a closed heating region, or alternatively form a plurality of separate heating regions. Accordingly, the temperature control device may comprise exactly one heating region or a plurality of heating regions.

Correspondingly, the temperature control device has at least one cooling region having at least one cooling element. It shall, however, be understood that also two, three, four, five, six seven, eight, nine, ten or more cooling elements can be provided. In this respect, a plurality of cooling elements can be arranged in one single cooling region, or can form a plurality of spaced cooling regions. Accordingly, the temperature control device may comprise exactly one cooling region or a plurality of cooling regions. In this respect, each of the cooling regions may be in particular different from the heating regions.

The temperature control device is formed to be flexible, at least in some regions, in particular to be completely flexible. In particular, the temperature control device is formed to be flexible in those regions which are designed for thermally contacting the container. By means of deformation of the flexible temperature control device, the temperature control device can be transferred from the open position to the arrangement position. The temperature control device can, for example, be formed to be substantially flat or plane in the arrangement position, wherein upon transfer from the open position to the arrangement position, the temperature control device mechanically contacts a container, such as a vessel having a curved wall, wherein the temperature control device bends or curves and, at least in some regions, fits on the wall of the container in the arrangement position. In other words, due to its flexibility, the temperature control device can be deformed or bent such that the temperature control device, in the arrangement position, contacts the wall of the container at least with the heating region and the cooling region over the whole surface, at least in some regions. In the arrangement position, the temperature control device thus is in form-fitting contact with the wall of the container, at least in some regions. This means that at least about 50%, preferably more than 80% of the area of the heating region and the cooling region of the temperature control device contacts the container, or is in form-fitting contact with the container.

The heating region and the cooling region of the temperature control device can be arranged on the container wall without any gap, thus generating a thermal contact between the temperature control device and the container, whereas other regions of the temperature control device do not have to contact the container.

The temperature control device may further be formed substantially tubular such that the container is insertable into the tubular shaped temperature control device. In other words, the temperature control device can have a container accommodation into which the container is insertable in an insertion direction, at least in some regions. The container accommodation of the temperature control device can have a greater inner diameter in the open position than in the arrangement position such that in the arrangement position, the container is insertable into the container accommodation of the temperature control device substantially in a forceless or contactless manner. Through transfer of the temperature control device from the open position to the arrangement position, the inner diameter of the container accommodation can be reduced such that the temperature control device thermally contacts the container in the region of the heating region and/or the cooling region. The temperature control device may, for example, be formed so as to be expandable, i.e. with a variable inner diameter such that temperature control device may be transferred into the open position by expansion for inserting the container into the container accommodation of the temperature control device. Preferably, the temperature control device is formed so as to be resilient, such that the temperature device automatically returns from the expanded state, i.e. the open position, into the not expanded state, i.e. the arrangement position. Thereby, a pressing force can be exerted by the temperature control device on the container such that thermal contact between the temperature control device and the container is advantageously improved.

The temperature control device can be formed as a sleeve that may have a lateral opening such that the sleeve can be bent up to enlarge the slit so that the sleeve can be placed around the container. In this respect, the lateral opening can be greater than the container on which the temperature control device is to be arranged. The opening may, however, also be smaller, in which case the container is not inserted into the sleeve via the lateral opening, at least on some regions, but via another opening wherein the lateral opening in particular serves for enlarging the inner diameter of the sleeve in order to allow for insertion of the container. After the container has been enclosed by the sleeve, the sleeve can be closed, i.e. it can be transferred into the arrangement position such that the temperature control device thermally contacts the container with the cooling region and/or the heating region.

Advantageously, the sleeve has high flexibility and, in the bent state, can have radii of curvature of about 2 cm to about 100 cm, preferably of 5 cm to about 50 cm. The sleeve can, for example have a rib structure which facilitates or enhances curvature of the sleeve in a preferred direction of curvature. In particular, the sleeve may be capable of being wound around the container. Correspondingly, the sleeve can be dimensioned such that the sleeve can be arranged on the container on the total circumference thereof in peripheral direction of the container, wherein the circumference of the container, and thus the length of the sleeve can be about 10 cm, about 20 cm, about 50 cm, about 100 cm, about 200 cm, about 300 cm or more. The size of the sleeve in height direction, perpendicular to the circumferential direction, may be about 10 cm, about 20 cm, about 50 cm, about 100 cm, about 200 cm, about 300 cm or more. Thus, sleeves can be formed with the length thereof being greater the height thereof, and vice versa.

The sleeve can be covered by a fabric, at least on some regions, or the surface of the sleeve can be made of a fabric, at least in some regions. Preferably, the sleeve can thus exhibit a surface which does not slip and/or is pleasant to handle, thereby facilitating use of the sleeve. In particular, a region of the sleeve surface oriented toward the container, or facing the container, or being designed to thermally contact the container can be formed different from a sleeve surface opposite the container.

The sleeve face opposite the container can be handled by a user. Therefore, this face can be made of a non-slip textile that is in particular detachably attached to the sleeve, and that is, for example, removable from the sleeve for washing. The sleeve face opposite the container may be insulated thermally with respect to the at least one heating element and the at least one cooling element. On the one hand, usability can be increased thereby, since a user can handle the sleeve even if it is being heated or cooled. On the other hand, thermal losses on the sleeve face opposite the container are minimized, thus increasing energy efficiency.

The side facing the container also may have a fabric or non-fabric (for example a plane elastomer coating). In this respect, the side of the sleeve, or in general of the temperature control device facing the container can be made of material having higher thermal conductivity than the material of the side of the sleeve or temperature control device opposite the container. In particular, the sleeve side facing the container can be made of a material having high adhesion to metal, glass and/or plastic material so as to allow for a close connection between the sleeve and the container.

In the open position, the temperature control device can be in a substantially flat or planar state enabling the temperature control device to be wound about the wall of the container at least in some regions. This flexible deformation of the temperature control device allows for transfer of the temperature control device from the open position into the arrangement position where the heating region and/or the cooling region thermally contact the enclosed container, at least on some regions.

A container within the meaning of the present application can be reaction vessels made of glass, metal, plastic, or ceramic materials. Preferably, the containers can have a round, i.e. approximately cylindrical or spherical shape. These substantially cylindrical or spherical shapes of the container allow for simple arrangement of the temperature control device on the container in a form-fitting manner. In particular, sleeve-shaped, or substantially tubular temperature control devices can be brought into form-fitting contact with substantially cylindrically shaped containers in a particularly easy manner, advantageously resulting in good thermal contact. Containers substantially having a cylindrical or spherical shape are, for example, pipes, test glasses, flasks, bio-reactor vessels, cans, bottles, syringes, bags, tubes, fittings, waste gas pipes or the like.

The temperature control device may comprise a fixing device that allows for securing the temperature control device in the arrangement position. The fixing device can have a fixing region to be engaged in with a complementary fixing region in the arrangement position of the temperature control device such that transfer of the temperature control device from the arrangement position to the open position is inhibited. The fixing device may, for example, be formed as a hook-and-pile fastener, wherein the fixing region is formed by the piles of the hook-and-pile fastener and the complementary fixing region is formed by the hooks of the hook-and-pile fastener. The fixing device may also be formed as a snap fastener, wherein the fixing region is formed as the female part of the snap fastener, whereas the complementary part of the fixing region is formed as the male part of the snap fastener. It shall be understood that the temperature control device may have a plurality of fixing devices. The temperature control device may have, for example, two, three, four, five, six, seven, eight, ten or more fixing devices.

The heating and cooling regions may be formed as spatially separated closed regions. In other words, the at least one heating element forms a compact heating region, whereas the at least one cooling elements forms a compact cooling region. This means that the heating region and the cooling region can be separated from each other by one single borderline. If a plurality of heating and cooling elements are provided, they are neither arranged alternately on the temperature control device, nor evenly distributed across the temperature control device, but form two separate regions.

Alternatively, the at least one heating element and the at least one cooling element can be arranged close to each other such that the heating region and the cooling region coincide on the contact area between the temperature control device and the container, at least in some regions, in particular completely. Thus, there is no spatial separation between the heating region and the cooling region but only a temporal separation depending on whether the heating element or the cooling element is activated. In particular, the at least one heating element and the at least one cooling element can be arranged so as to be intertwined with each other in order to avoid spatial separation of the heating element and the cooling element.

In other words, the invention can relate to a temperature control device for controlling the temperature of a container, comprising
  at least one heating element, and
  at least one cooling element,
wherein the temperature control device is formed to be flexible, at least in some regions, wherein the temperature control device can be transferred from an open position to an arrangement position by flexible deformation, and wherein the temperature control device, in the arrangement position, can be arranged and thermally contacted on a wall of the container in a form-fitting manner, at least in some regions, such that the temperature of the container can be controlled by means of the at least one heating element and the at least one cooling element.

In this respect, the at least one heating element and the at least one cooling element can be designed to have a planar form and can be arranged substantially parallel to each other. In other words, the temperature control device can have the at least one heating element arranged on a side facing the container, whereas the at least one cooling element is arranged on the side of the at least one heating element opposite the container. Alternatively, the temperature control device can have the at least one cooling element arranged on a side facing the container, whereas the at least one heating element is arranged on the side of the at least one cooling element opposite the container. In particular, there can be provided exactly one heating and/or exactly one cooling element.

The at least one heating element and the at least one cooling element can be operated simultaneously. Advantageously, this allows for heating one region of the container while cooling another region of the container. Thereby, a temperature gradient can be created within the container. In particular in the case of elongated containers, i.e. containers extending longer in a longitudinal direction than in a transverse direction, perpendicular than the longitudinal direction, by a factor of greater than about 2, preferably greater than about 5, and in particular greater than 10, such as pipes or tubes, it is possible to create a temperature gradient within the container.

A temperature gradient within the container can be used for controlling a chemical reaction and/or a biological process. For example, one region of the container can be heated by means of the heating region in order to supply activating energy to educts or starting material present in the container, thereby initiating a chemical reaction or a biological process. The educts, for example in an aqueous solution, can thereby be transferred through the container, for example a pipe, to a region cooled by the at least one cooling heating. This enables, for example, dissipation of a heat of reaction created during the chemical reaction in process. Advantageously, the aqueous solution flows from the heating region toward the cooling region within the container in this case.

The at least one heating element can be heated electrically. The at least one heating element can, for example, be formed as a heating resistor such that an electric current flowing through the heating element is converted into thermal energy at the heating resistor. The electric heating element can be operated both at direct voltage and at alternating voltage. In particular, the at least one heating element arranged in the heating region can be designed to provide a heating energy of about 100 W to about 400 W, preferably of about 150 W to about 350 W, in particular about 250 W. The at least one heating resistor can, for example, be operated at a direct current of about 12 V to about 60 V, preferably about 24 V to about 50 V, in particular 48 V, wherein the current flowing through the at least one heating resistor can have an amperage of about 20 A to about 40 A. The thermal energy generated by the at least one heating element can be sufficient for achieving a change of temperature of the container between about 10° C. per hour and about 30° C. per hour, preferably between about 15° C. per hour and about 20° C. per hour. In other words, a difference in temperature between the actual temperature of the container and the desired temperature of the container of about 10° C. to about 20° C. is compensated in about one hour or less.

The at least one heating element can be formed as a Peltier element wherein the current flow through the Peltier element is controlled such that the heating side of the Peltier element faces the container or the opening of the container accommodation. Preferably, thermal energy from the environment can be guided toward the container through the Peltier element. Further advantageously, the heating element can be turned into a cooling element by reversing the current flow, since in this case the heating side of the Peltier element turns into the cooling side of the Peltier element. In this case a heating element could be provided which can also serve as a cooling element such that a separate cooling element can be omitted. In this case, the temperature control device for controlling the temperature of the container would contain at least one combined heating and cooling region comprising at least one Peltier element, wherein the temperature control device is formed to be flexible, at least in some regions, wherein the temperature control device can be transferred by flexible deformation from an open position to an arrangement position, and wherein the temperature control device, in the arrangement position, can be arranged on a wall of the container in a form-fitting manner, at least in some regions, and can be thermally contacted such that the temperature of the container can be controlled by means of the at least one Peltier element. For example, a sleeve could be provided having exactly one Peltier element or a plurality of Peltier elements.

The at least one cooling element can be cooled by a cooling fluid or can be electrically cooled. Further preferably, the at least one cooling element comprises a cooling fluid pipe which can be supplied with a cooling fluid via a flow pipe, said cooling fluid flowing through the cooling fluid pipe to a return pipe. The cooling fluid pipe can be formed to be flexible and/or expandable so as to be capable of deforming or shifting upon transfer of the temperature control device from the open position to the arrangement position. The cooling fluid can be a liquid, a gas, or a liquid-gas-mixture. Water, oil, or another liquid can be preferably used as cooling fluid. The cooling fluid supplied to the flow pipe advantageously has a lower temperature than the container to be cooled. The cooling fluid in the cooling fluid pipe is heated by the thermal energy drawn from the container, whereby the container cools correspondingly. The heated cooling fluid is pushed out of the cooling fluid pipe by fresh, cool cooling fluid flowing into the cooling fluid pipe via the flow pipe, and discharges via the return pipe. The temperature of the cooling fluid at the flow pipe can, for example, be about 5° C. to about 10° C., in particular about 8° C. The cooling energy of all of the cooling elements provided in the cooling region preferably is about 150 W. In particular, the temperature control device can be designed for achieving a change in temperature between about 5° C. per hour and about 10° C., preferably between about 5° C. per hour and about 20° C. per hour. It is particularly preferred if the at least one cooling element is formed as a Peltier element. As explained above with respect to the at least one heating element, a current flowing through a Peltier element causes the Peltier element to heat at one side thereof, while the other sides cools down. Accordingly, a current flow through the Peltier element can be applied such that the cooling side of the Peltier element is facing the container or the container accommodation of the temperature control device. Advantageously, reversion of the current flow can cause the Peltier element to change from a cooling element to a heating element.

Correspondingly, the at least one cooling element can serve as a heating element even if the cooling fluid pipe is supplied, via the flow pipe, with a fluid having a temperature higher than the temperature of the container. Thereby, the container is heated while the fluid cools and discharges from the cooling fluid pipe through the return pipe after cooling.

The temperature control device may comprise at least one insulating layer arranged on the side of the temperature control device opposite the container. It shall be understood that there can be provided also two, three, four or more insulating layers. The at least one insulating layer causes thermal insulation of the container, as well as of the heating region and the cooling region, with respect to the ambient temperature. The ambient temperature is the room temperature of the room where the container and the temperature control device arranged thereon are located. For example, the insulating layer can be made of a foamed plastic material, like styrofoam, a mineral insulating material, like glass wool or stone wool or any other thermally insulating material. Advantageously, the at least one heating element and/or the at least one cooling element are arranged between the insulating layer and the container, or the container accommodation of the temperature control device when the temperature control device is in the arrangement position.

The temperature control device may comprise a temperature sensor by means of which the temperature of the container can be detected. In particular, the temperature sensor can be arranged on a wall of the container accommodation of the temperature control device in order to be in thermal contact with the container in the arrangement position of the temperature control device. The temperature sensor can be designed for being connected with a control device suited for controlling the at least one heating element and/or the at least one cooling element. In particular, the control device can be part of the temperature control device. Alternatively, the control device can be an external control device connectable with the temperature control device. To this end, the temperature control device can have in particular an electrical connector which is connectable to a complementary electrical connector of the control device.

One aspect of the invention relates to an arrangement, comprising:
 a temperature control device according to the invention,
 a container with which the temperature control device is arranged in thermal contact, and
 a control device which controls the at least one heating element and the at least one cooling element of the temperature control device.

The temperature control device is arranged and thermally contacted on the container in an arrangement position. The thermal contact between the temperature control device and the container allows for heat flow from the at least one heating element to the container, and from the container to the at least one cooling element. The control device can be part of the temperature control device or can be provided as external control device. The control device activates or deactivates the at least one heating element and the at least one cooling element. Preferably, the control device is connected to a temperature sensor which measures the actual temperature of the container. By means of the control device, the temperature of the container can be kept at a predetermined constant value. Further, the control device can activate the at least one heating element in order to increase the temperature of the container to a predetermined value. Equivalently, the control device can activate the at least one cooling element in order to decrease the temperature of the container to a predetermined value.

If the at least one heating element is operated electrically, the control device can control the current flow through the at least one heating element, in particular depending on an actual temperature detected by the temperature sensor. Correspondingly, the control device can control a current flow through the at least one cooling element if this at least one cooling element is operated electrically. If the at least one cooling element is cooled by means of a cooling fluid, the arrangement can have a cooling fluid source supplying cold cooling fluid. The cooling fluid source can be in fluid connection with a flow pipe of the at least one cooling element in order to supply the at least one cooling element with cool cooling fluid. In particular, the cool cooling fluid can have a temperature of about 5° C. to about 10° C. The cooling fluid flows from the flow pipe of the at least one cooling element to the return pipe of the at least one cooling element, and in this process it is heated by the thermal energy dissipated by the container. The heated cooling fluid can be returned to a cooling fluid trough where it is either discarded or cooled and supplied to the cooling fluid source. At least one valve for limiting the flow of cooling fluid to the flow pipe can be arranged between the cooling fluid source and the flow pipe of the at least one cooling element. The valve can be controlled by the control device depending on the temperature of the container.

Correspondingly, the at least one heating element can be operated using a heating fluid. To this end, the arrangement can have a heating fluid source providing a hot fluid, in particular having a temperature of about 30° C. to about 100° C. or about 120° C. The heating fluid source can be in fluid connection with a flow pipe of the at least one heating element. The hot fluid flows from the flow pipe of the at least one heating element to the return pipe of the at least one heating element, and in this process it gives off thermal energy to the container. From the return pipe, the cooled heating fluid can flow to a heating fluid trough where it is either discarded or re-heated and supplied to the heating fluid source. Water and oil are particularly suited for use as the cooling and heating fluids.

The control device preferably can have a plurality of control units wherein, in particular, each of the control units can control one or more heating elements or one or more cooling elements assigned thereto.

Preferably, the container where the temperature control device is arranged on is formed as a conduit. For example, the conduit can be designed for conducting a gas, in particular outlet air or inlet air. Preferably, the conduit can have a diameter of about 1 cm to about 50 cm, in particular from about 10 cm to about 20 cm in order to reduce losses of the flowing gas or air due to friction on the conduit wall. For the purpose of, for example, condensing substances from the gas flowing in the conduit, the temperature control device can cool the conduit, at least in some regions, in particular to a temperature falling below the dew-point of the substance to be condensed from the gas. For sterilization of the gas when flowing through the conduit, the conduit can be heated, at least in some regions, in particular to a temperature of about 90° C. to about 120° C.

The conduit may have a connection configuration for establishing a detachable fluid connection with a complementary connection configuration of a further container. In particular the connection configuration can have an aseptic connector. Preferably, the conduit can be in fluid connection with a reaction vessel or a bio-reactor container through the connection configuration, for example, in order to discharge the waste gas produced during a chemical reaction or a biological process. Depending on the reaction carried out, sterilization of the waste gas is required, or substances contained in the waste gas must be removed from the waste gas by condensation. As described above, the conduit can be cooled or heated by means of the temperature control device.

In other words, the invention can further relate to a waste-gas temperature control device, in particular an outlet-air temperature control device, having
  a waste gas conduit having a connection configuration suited for for detachable fluid connection with a complementary connection configuration of a container;
  a temperature control device according to the invention detachably or permanently attached to the waste gas conduit and thermally contacting the waste gas conduit, in order to control the temperature of a waste gas, in particular outlet air, flowing through the waste gas conduit, and
  a control device for controlling at least one heating element and at least one cooling element of the temperature control device.

In particular, the waste-gas temperature control device can be connectable with or be connected to a bio-reactor. In dependence on the process carried out in the bio-reactor, the outlet-air can be cooled and/or heated. Preferably, the at least one cooling element can be arranged upstream of the at least one heating element, with respect to the waste gas. Thereby, it is possible, for example, to carry out condensation of substances from the waste gas or outlet air, followed by sterilization of the waste gas.

One aspect of the present application relates to a method for using a temperature control device according to the invention for controlling the temperature of a container, wherein the temperature control device is arranged on the container in an open position, and is transferred into the arrangement position wherein the at least one heating element and the least one cooling element of the temperature control device are thermally contacted with the container, and wherein the at least one heating element is activated for heating the container, or the at least one cooling element is activated for cooling the container.

By use of the temperature control device, the container can advantageously be heated, cooled or kept at a predetermined constant temperature. It shall be understood that the contents of the container, too, can be heated, cooled, or kept at a constant temperature, together with the container. Heating or cooling of the container by the temperature control device takes place after transfer of the temperature control device from the arrangement position into an operating position, wherein in the operating position the at least one heating element of the temperature control device is connected to a power source if the at least one heating element is electrically operated, or is in fluid connection with a heating fluid source if the heating element is operable by means of a heating fluid. Further, in the operating position the at least one cooling element can be connected to a power source if the at least one cooling element is electrically operated, or is connected to a cooling fluid source if the at least one cooling element is operable by means of a cooling fluid. In the operating position, the temperature control device can further be connected to an external control device for controlling the operation of the at least one heating element and the at least one cooling element. In the operating position, a temperature sensor connected with the control device can further thermally contact the container for detecting the actual temperature of the container and supplying said actual temperature to the control device such that the control device is capable of activating or deactivation the at least one heating element or the at least one cooling element depending on the actual temperature.

The temperature control device can be used, for example in the field of biotechnology, in chemical industry, in medical technology, in the field of food processing, and in catering industry. In particular, biotechnical reactions are highly temperature-dependent such that a variation of the temperature by 1° C. inside a bio-reactor can lead to a change in the yield of a product to be produced by more than 10%. Since mainly bags or disposable containers made of plastic material and having a minor wall thickness are used as bio-reactor container, rapid heat flow through the wall of the bioreactor container is possible which should be compensated. In medical technology, aseptic disposable containers are widely used wherein these disposable containers, too, have almost no heat insulating properties, and the contents of the container quickly assume ambient temperature. This is, however, often undesirable. On the contrary, (cell)cultures and other medical products should be kept at a constant temperature, as far as possible, also and especially during transport or in locations where there is no thermostat or cryostat or the like. The temperature control device can be used especially in such cases. Also in the area of food processing and in catering industry, controlling the temperature of containers by means of the temperature control device of the invention is advantageous. For example, dishes can be heated or cooled in a container depending on the requirements and the type of the dish. For example, dishes prepared ahead can first be cooled in a container in order to preserve them for a longer time, and can subsequently be heated if required in the same container.

Method of Manufacturing

The temperature control device can advantageously be manufactured in a few steps, for example by the following manufacturing steps:
a) providing an envelope or a sleeve;
b) providing at least one heating element;
c) providing at least one cooling elements;
d) arranging or fixing the at least one heating element and the at least one cooling element in or on the envelope or sleeve.

Preferably, the manufacturing method comprises the additional step of arranging or fixing at least one fixing device on the envelope or the sleeve. It shall be understood that the above-mentioned step a) can already include fixing of the fixing device.

A preferred embodiment of a temperature control device and an arrangement is described below by way of example, referring to the accompanying drawings. Therein

BRIEF DESCRIPTION OF THE DRAWINGS

FIG. 6 a) is a plan view and b) a side view of a further embodiment of the temperature control device.

DETAILED DESCRIPTION

Figure 1:
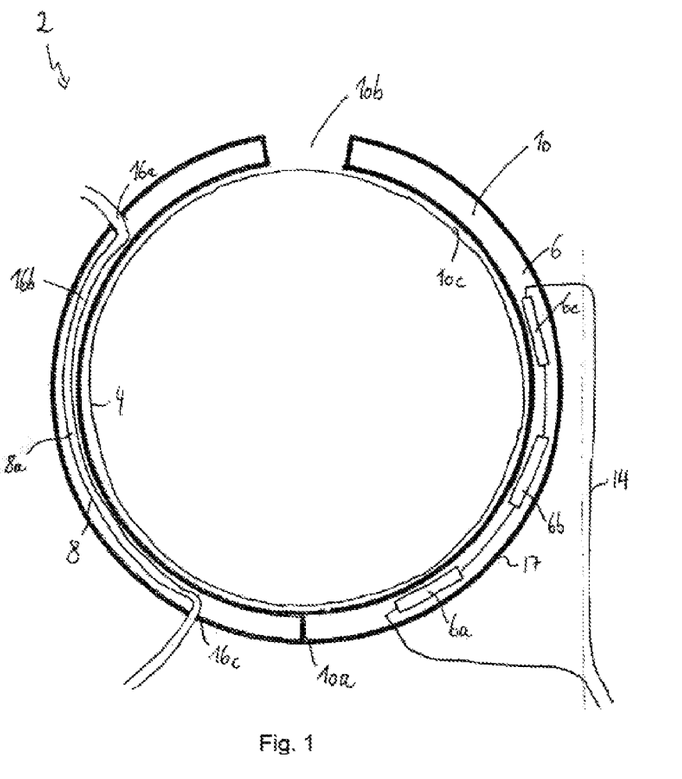
FIG. 1 is a first sectional view of an embodiment of the temperature control device.
Figure 2:
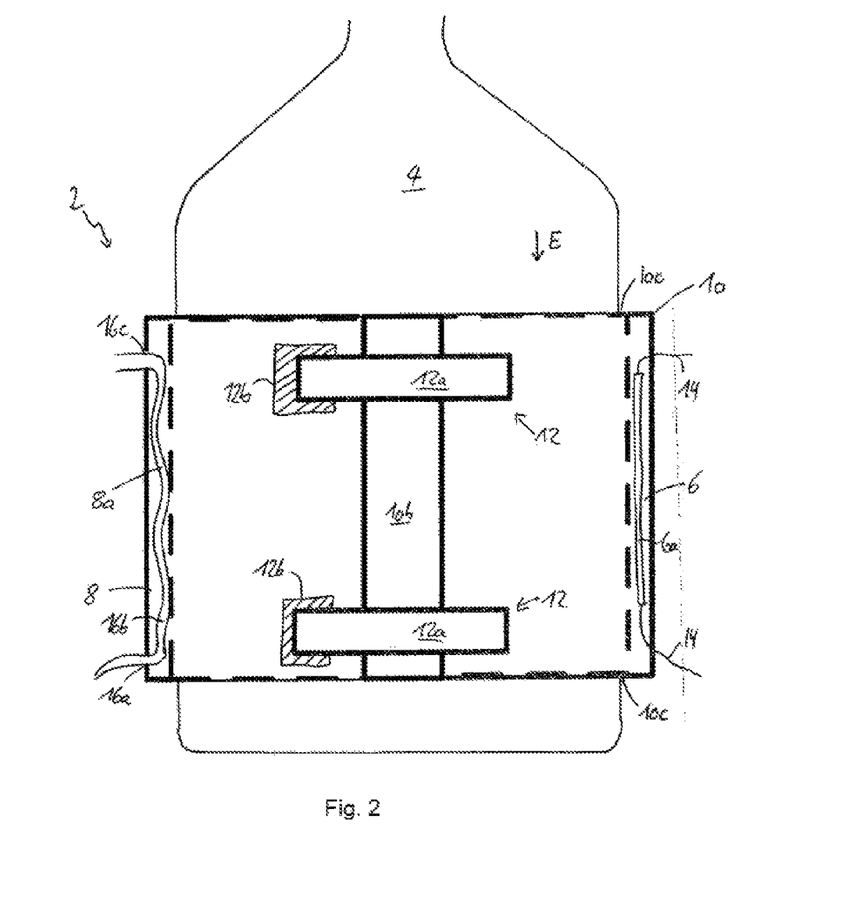
FIG. 2 is a further sectional view of the embodiment shown in FIG. 1.

FIG. 1 shows a first sectional view through a temperature control device 2 designed for controlling the temperature of a container 4. FIG. 2 shows a further sectional view through the temperature control device 2 wherein the section is oriented in the direction perpendicular to the section shown in FIG. 1. The temperature control device 2 comprises a heating region 6 having at least one heating element 6a and a cooling region 8 having at least one cooling region 8a. As shown in FIG. 1, a plurality of heating elements 6a, 6b, 6c can be arranged in the heating region 6, too.

In the embodiment shown in FIG. 1, the temperature control device 2 has a sleeve 10 which is flexible, at least on some regions, in order to allow for opening and closing of the sleeve 10. To this end, the sleeve 10 can have a flexible bending region 10a, and an opening region 10b through which the container 4 can be inserted in the open position of the temperature control device 2 so as to be arranged in a container accommodation 10c. The temperature control device 2 can also have no lateral opening region 10b, and the internal diameter of the container accommodation 10c can be enlarged by expanding the temperature control device 2 such that the container 4 is insertable into the container accommodation 10c along an insertion direction E, at least in some regions, in the expanded state, i.e. in the open position of the temperature control device 2. The internal diameter can then be reduced by means of contraction of the temperature control device 2 in order to transfer the temperature control device 2 to the arrangement position such that relative movement of the container 4 and the temperature control device 2 is inhibited by the friction present therebetween.

Within the region of the heating elements 6a, 6b, 6c, and the at least one cooling element 8a, the sleeve 10, or the temperature control device 2 can be formed to be substantially rigid. Thus, the sleeve 10 is designed for use with a container 4 of a specific diameter. The sleeve 10 can further be formed to be completely flexible. In particular, the sleeve 10 can be formed to be substantially flexible within the region of the heating elements 6a, 6b, 6c, and the at least one heating element 8, allowing for use of the sleeve 10 with containers 4 of different diameters. In particular, the temperature control device 2, or the sleeve 10 can mechanically and thermally contact the container with the regions formed to be flexible.

By means of a flexible deformation of the sleeve 10, the temperature control device 2 can be transferred from an open positon wherein the temperature device 2 can be arranged on the container to an arrangement position wherein the temperature control device 2 rests on the container 4 in a substantially form-fitting manner and is thermally contacted with the container 4.

A fixing device 12 is provided for holding the temperature control device 2 in place, by means of which fixing device the temperature control device 2 can be secured in the arrangement position. In the embodiment shown, the fixing device 12 has a fixing region 12a formed as the pile part 12a of a hook-and-pile fastener to be engaged with a complementary fixing region 12b formed as the hook part 12b of a hook-and-pile fastener, in order to secure the sleeve 10 on the container 4. Therefore, the sleeve 10 can be held in friction fit or form fit with the container 4 in the arrangement position, wherein a movement of the temperature control device 2 relative to the container 4 is inhibited by the friction between the sleeve 10 and the wall of the container 4.

As shown in FIG. 1, the heating region 6 and the cooling region 8 are spatially separated from each other. Preferably, the heating region 6 and the cooling region 8 both are geometrically compact regions. In other words, the heating region 6 and the cooling region 8 are not intertwined with each other and do not penetrate each other. The term "compact" can be understood in particular such that the shortest connection line between two points on the heating region 6 inside the temperature control device does not cross the cooling region 8, and that correspondingly, the shortest connection line between two points on the cooling region 8 inside the temperature control device does not cross the heating region 6.

The heating elements 6a, 6b, 6c shown in FIGS. 1 and 2 can be electrically heated. Advantageously, the heating elements 6a, 6b, 6c can be formed as heating resistors wherein electric current supplied by electric cables 14 and flowing through the heating elements 6a, 6b, 6c is converted to thermal energy by the heating resistors 6a, 6b, 6c. The electric heating elements 6a, 6b, 6c can be operated at direct voltage as well as at alternating voltage. Preferably, the heating elements 6a, 6b, 6c are operated at a low (direct) voltage of about 12 V to about 60 V, preferable about 48 V, such that a user is not exposed to dangerous electric voltage in case of a technical fault. The heating elements 6a, 6b, 6c together can yield a heating energy of about 100 W to about 400 W.

The cooling element 8a arranged in the cooling region 8 comprises a cooling fluid pipe 16b which is supplied with a cooling fluid via a flow pipe 16a, wherein the cooling fluid flows through the cooling fluid pipe 16b to a return pipe 16c. Water, oil or any other fluid can serve as the preferred cooling fluid. The cooling fluid supplied to the flow pipe advantageously has a temperature lower than the container 4 to be cooled, wherein thermal energy is drawn from the container 4 in the cooling region, whereby the cooling fluid is heated in the cooling fluid pipe 16b, whereas the container 4 cools correspondingly. The temperature of the cooling fluid at the flow pipe 16a can for example be about 5° C. to about 10° C., in particular about 8° C.

In order to provide for thermal insulation of the container 4 with respect to the environment, the temperature control device 2 can have an insulating layer 17 arranged on the side of the temperature control device 2 opposite the container 4. Correspondingly, the side of the sleeve 10 opposite the container 4 can be formed as an insulating layer 17, at least in some regions. The insulating layer can consist, for example, of a foamed plastic material (e.g. styrofoam or polyurethane), a mineral insulating material (e.g. glass wool or stone wool), or any other thermally insulating material.

Figure 3:
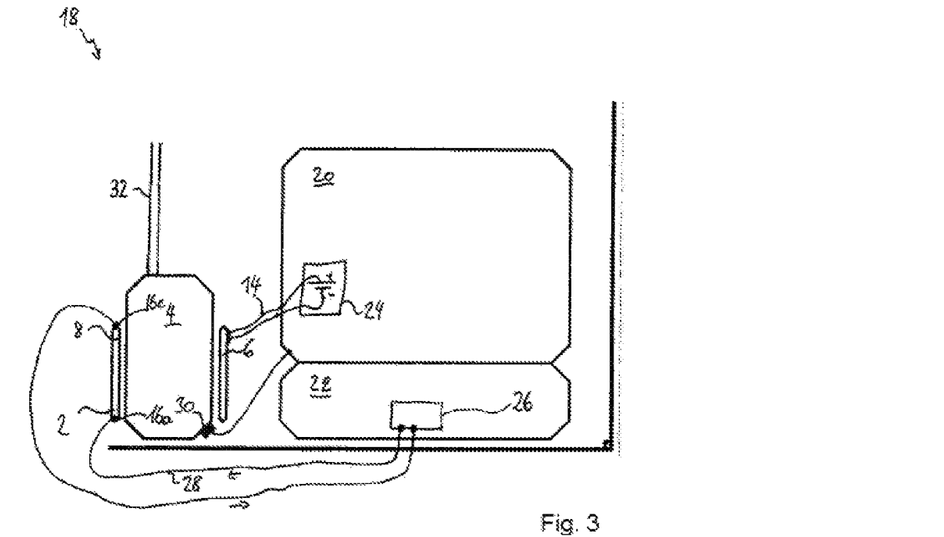
FIG. 3 is an arrangement having a temperature control device.

FIG. 3 show an arrangement 18 comprising a temperature control device 2, a control device 20, and a cooling device 22. The temperature control device 2 is arranged and thermally contacted on the container 4 in an arrangement position. The thermal contact allows for heat flow from the heating region 6 to the container 4 and from the container 4 to the cooling region 8. The control device 20 can be formed as an external control device 20. The control device 20 activates or deactivates the at least one heating element of the heating region 6 which is in electric contact with the control device via the electric cables 14. The control device 20 can have a power source 24 for operating the at least one heating element.

The arrangement 18 further comprises a cooling device 22 further having a cooling fluid source 26 for providing cool cooling fluid which is in fluid contact with the flow pipe 16a of the at least one cooling element of the cooling region 8 via a fluid pipe 28. Cool cooling fluid is supplied to the at least one cooling element via the flow pipe 16a, and is heated in the at least one cooling element when flowing to the return pipe 16c. The heated cooling fluid can be returned to the cooling device 22 as cooling fluid trough where it is cooled down and returned to the cooling fluid source 26.

The cooling fluid source 26 can be controllable with respect to volume flow and temperature of the cooling fluid. In particular, a valve can be provided which can limit the supply of cooling fluid to the flow pipe 16a. The valve can be controlled by the control device 20 in dependence on the temperature of the container 4. To this end, the control device 20 can be connected to a temperature sensor 30 which measures the actual temperature of the container 4. By means of the control device 20, the temperature of the container 4 can be kept at a predetermined constant value, for example within an interval of about +/−0.2 degrees. If the actual temperature falls below the predetermined desired temperature by more than about 0.2 degrees the control device 20, can activate the at least one heating element to increase the temperature of the container 4. Correspondingly, the control device 20 can activate the at least one cooling element to decrease the temperature of the container 4 if the temperature exceeds the predetermined desired temperature by more than about 0.2 degrees.

An outlet can be formed or arranged on the container for charging or discharging the container 4. The outlet 32 can also serve as an outlet-air pipe 32 in order to allow for pressure compensation of the interior of the container with the environment. In particular, gaseous products of a chemical reaction or of biological processes can be discharged from the container 4 by means of the waste gas pipe 32.

Figure 4:
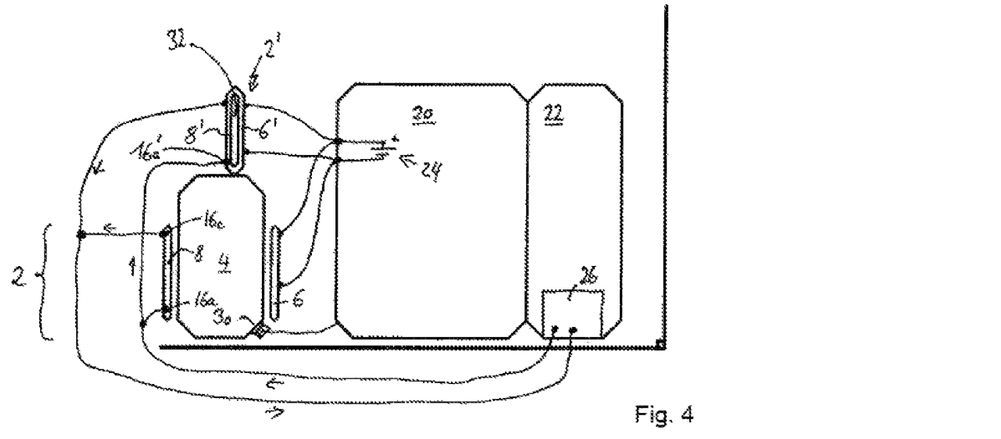
FIG. 4 is a further embodiment of an arrangement having a temperature control device.

FIG. 4 shows an arrangement 18' having a first temperature control device 2, a control device 20, and a cooling device 22, formed substantially like the arrangement shown in FIG. 3, wherein identical elements are designated by identical reference signs. In addition, the arrangement 18' has a second temperature control device 2' suitable for cooling an outlet-air pipe 32. Any other connecting device can be provided instead of the outlet-air pipe 32, for establishing fluid connection of the container 4 with a further element or assembly. The second temperature control device 2' can be formed to be substantially identical to the first temperature control device 2, wherein in particular the size of the second temperature control device 2' can differ from the size of the first temperature control device 2 since, in particular, the diameter of the outlet-air pipe 32 can be smaller than that of the container 4. Accordingly, the heating region 6' and the cooling region 8' of the second temperature control device 2' can be connected to the control device 20 and the cooling device 22 in parallel to the first temperature control device 2. Of course, temperature control for the first temperature control device 2 can be performed independently of the second temperature control device 2'. To this end, a controllable valve (not shown) can be arranged in each of the inlets of the flow pipes 16a and 16a' in order to control the volume flow of cooling fluid to the first temperature control device 2 and the second temperature control device 2' by means of the control device 20. Likewise the electric heating elements of the first and second temperature control devices 2, 2' can be independently controllable.

Figure 5:
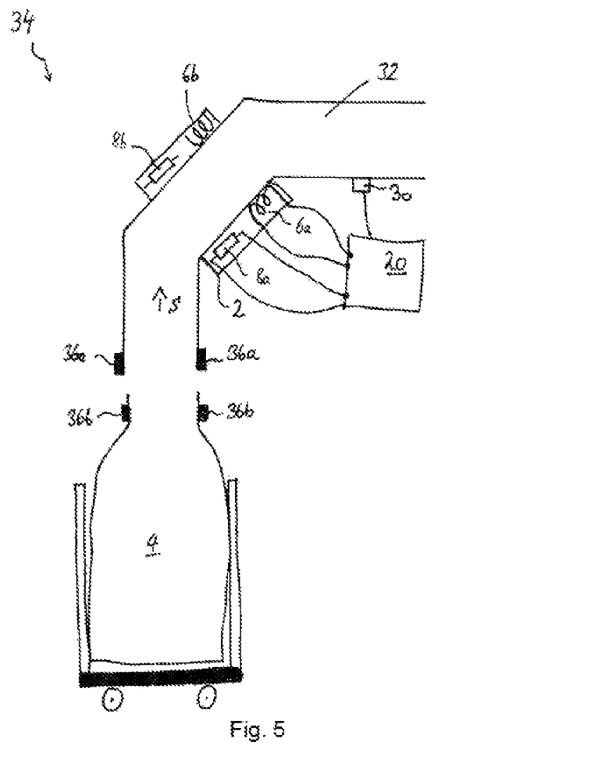
FIG. 5 is an embodiment of a waste-gas temperature control device.

FIG. 5 shows a waste-gas temperature control device 34 as preferred embodiment of a temperature control device. The waste-gas temperature control device 34 has a waste-gas pipe 32 with a connection configuration 36a which can be brought into detachable fluid connection with a complementary connection configuration 36b of a container 4. A temperature control device 2 is detachably or permanently attached to the waste-gas pipe 32, with the temperature control device 2 comprising at least one cooling element 8a, 8b and at least one heating element 6a, 6b. The temperature control device thermally contacts the waste-gas pipe 32, whereby the temperature of a waste gas flowing through the waste-gas pipe 32 in a flow direction S can be controlled. Advantageously, a temperature sensor 30 is provided, which is contacted or connected to a control device 20, wherein the control device 20 controls the at least one heating element 6a, 6b and the at least one cooling element 8a, 8b of the temperature control device 2. In other words, the temperature control device 2 and the control device 20 can be arranged in analogy to the arrangements shown in FIGS. 3 and 4.

The container 4 can be a bio-reactor container 4 which is temporarily brought into fluid connection with the waste-gas temperature control device 34 and which is in particular disposed of after the bio-reaction has been carried out. Depending on the bio-reaction carried out in the bio-reactor 4, the outlet-air can be cooled and/or heated. Advantageously, the at least one cooling element 8a, 8b can cause condensation of substances from the waste gas, with the condensate flowing back into the bio-reactor 4. Subsequently, the waste gas can be heated by the at least one heating element 6a, 6b to temperatures above about 90° C., preferably above about 100° C. in order to sterilize the waste gas.

In particular, the waste-gas temperature control device 34 allows for enhancing the efficiency of a sterile filter (not shown) which is arranged downstream in the waste-gas flow. Sterile filters allow for filtration of micro-organisms, for examples bacteria and viruses out of the waste-gas in order to avoid contamination of the environment. Humidity present in the waste-gas, however, leads to an increased flow resistance or to blocking of the sterile filter. By means of cooling the waste-gas using the at least one cooling element of the temperature control device, humidity may be condensed out of the waste gas and be in particular returned to the container in order to reduce the absolute humidity of the waste gas. Preferably, the waste gas can be heated subsequently using the at least one heating element of the temperature control device which causes decrease of the relative humidity of the waste gas. Thereby, indirect heating of the sterile filter is possible, whereby depositing of the humidity in the sterile filter can be prevented.

Figure 6A:
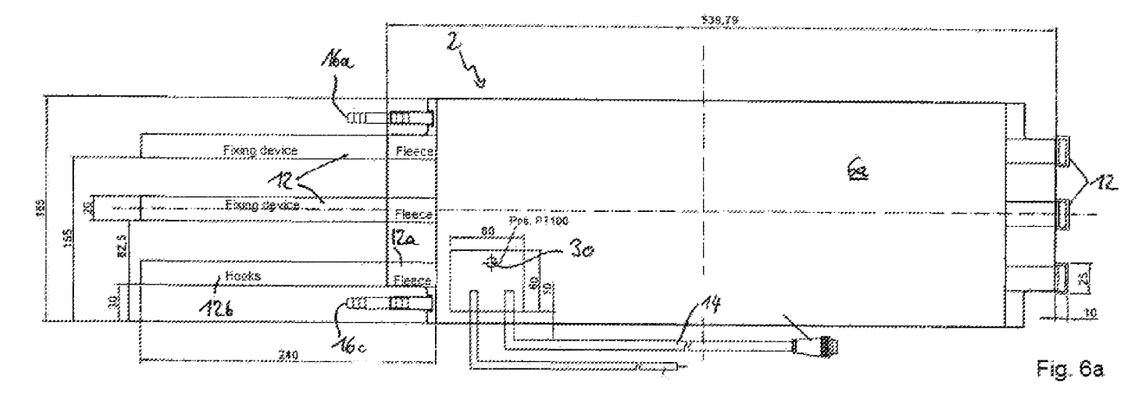
Figure 6B:
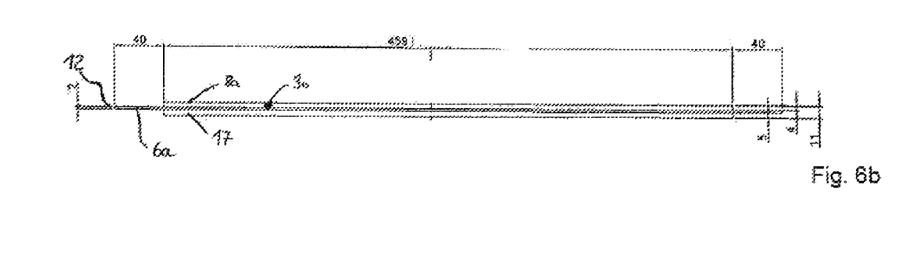

FIG. 6a shows a plan view and FIG. 6b shows a side view of a further embodiment of the temperature control device 2, wherein the view of FIG. 6b is oriented perpendicularly to the view of FIG. 6a. The temperature control device 2 comprises a heating element 6a and a cooling element 8a. The heating element 6a and the cooling element 8a each are formed to have a larger surface. In other words, the extension in longitudinal and transverse direction is greater than the extension in height direction by a factor of greater than about 5, preferably greater than about 10. The heating element 6a and the cooling element 8a are arranged substantially parallel to each other in the temperature control device which is formed as sleeve. Therein, the cooling element 8a is facing the container (not shown), and during operational use of the temperature control device, it is arranged closer to the container than the heating element 6a.

The heating element 6a and the cooling element 8a are thermally insulated with respect to the environment by means of an insulating layer 17 arranged on the side of the temperature device 2 opposite the container.

A fixing device 12 formed as a hook-and-pile fastener 12 is provided for securing the temperature control device 2 on the container, said hook-and-pile fastener having a pile part 12a, or fleece 12a, and a hook part 12b.

A temperature sensor 30 suited to be connected with a control device can be arranged in the temperature control device, for example in a layer in which the cooling element 8a or the heating element 6a is arranged. Preferably, the temperature sensor is arranged such that it can thermally and/or mechanically contact the container in order to measure the actual temperature thereof.

The individual elements and the functions thereof correspond to the elements and functions described with reference to Figure, and identical elements are designated by identical reference signs.

LIST OF REFERENCE SIGNS 2 temperature control device
4 container
6 heating region
6a-c heating element
8 cooling region
8a cooling element
10 sleeve
10a bending region
10b opening region
10c container accomodation
12 fixing device
12a fixing region
12b complementary fixing region
14 electric cable
16a flow pipe
16b cooling fluid pipe
16c return pipe
17 insulating layer
18 arrangement
20 control device
22 cooling device
24 power source
26 cooling fluid source
28 cooling fluid pipe
30 temperature sensor
32 outlet-air pipe or outlet
34 waste-gas temperature control device
36a connection configuration
36b complementary connection configuration
E insertion direction
S flow direction

The invention claimed is:

1. A temperature control device (2) for controlling the temperature of a fluid in a container (4) that has a side wall extending around an outer circumference of the container, the side wall of the container having first and second outer circumferential areas that are spatially separate from one another, the temperature control device (2) comprising:

a sleeve (10) that is sufficiently flexible to be wrapped around the side wall of the container (4) and to conform to the outer circumference of the side wall of the container (4), at least one pair of fixing devices (12) on the sleeve (10) and being releasably engageable with one another, the sleeve (10) and the fixing devices (12) being dimensioned to enable the fixing devices (12) of the at least one pair to be releasably engaged with one another for holding the sleeve (10) wrapped around the side wall of the container (4), the sleeve (10) further including:

a heating region (6) configured for contacting the first outer circumferential area of the container (4), and a cooling region (8) configured for contacting the second outer circumferential area of the container (4), the heating region (6) and the cooling region (8) being spatially separated from one another, at least one heating element (6a, 6b, 6c) disposed entirely and exclusively in the heating region (6) of the sleeve (10), at least one cooling element (8a) disposed entirely and exclusively in the cooling region (8) of the sleeve (10) so that the heating region (6) of the sleeve (10) has no cooling element and so that the cooling region of the sleeve (10) has no heating element, and a cover covering at least parts of the at least one heating element (6a, 6b, 6c) and the at least one cooling element (8a), the cover including an inner layer disposed to face the container (4) and an outer layer disposed to face away from the container, the inner layer being formed from a material that has higher thermal conductivity than the outer layer, wherein the temperature control device (2) can be transferred from an open position to an arrangement position by flexible deformation of the sleeve (10), and wherein the temperature control device (2), in the arrangement position, can be arranged on the side wall of the container (4) in a form-fitting manner, at least in some regions, so that the heating region (6) can be thermally contacted with the first outer circumferential area of the container (4) without contacting the second outer circumferential area of the container (4) and so that the cooling region (8) can be thermally contacted with the second outer circumferential area of the container (4) without contacting the first outer circumferential area of the container (4) such that the temperature of the container (4) can be controlled by means of the at least one heating element (6a, 6b, 6c) and the at least one cooling element (8a) for establishing a temperature gradient between the first and second outer circumferential areas of the container (4) for controlling a chemical reaction or a biological process in the container (4).

2. The temperature control device (2) of claim 1, wherein the fixing device (12) is formed as a hook-and-pile fastener.

3. The temperature control device (2) of claim 1, wherein the at least one heating element (6a) is electrically heatable.

4. The temperature control device (2) of claim 1, wherein the at least one cooling element (8a) can be cooled by means of a cooling fluid or can be cooled electrically.

5. The temperature control device (2) of claim 1, wherein the outer layer comprises at least one insulating layer.

6. The temperature control device (2) of claim 1, wherein the at least one heating element (6a) and the at least one cooling element (8a) are parallel to each other.

7. The temperature control device (2) of claim 1, wherein the inner layer of the cover is formed from a material that exhibits adhesion to the container.

8. The temperature control device (2) of claim 1, wherein the outer layer of the cover comprises a textile.

9. The temperature control device (2) of claim 1, wherein the at least one cooling element (8) is disposed closer to the container (4) than the at least one heating element (8).

10. The temperature control device (2) of claim 1, wherein the container further comprises a waste gas pipe (32), and wherein the temperature control device further comprises a waste gas pipe heating region (6') and a waste gas pipe cooling region (8') thermally contacting the waste gas pipe (32), and a control device (20) connected to the at least one heating element (6), the at least one cooling element (8), the waste gas pipe heating region (6') and the waste gas pipe cooling region (8') for independently controlling the temperature of media in the container (4) and for independently controlling absolute humidity of waste gas in the waste gas pipe (32).

11. The temperature control device of claim 1, wherein the sleeve (10) has a flexible bending region (10a) and an opening region (10b), the opening region (10b) being defined by first and second edges, the heating region (6) extending from the flexible bending region (10a) and the first edge of the opening region (10b) and the cooling region (8) extending from the flexible bending region (10a) to the second edge of the opening region (10b).

12. A temperature control device (2) for obtaining a controlled temperature gradient at different areas of a fluid during a chemical reaction or a biological process, the temperature control device comprising:
a container (4) for containing the fluid during the chemical reaction or the biological process, the container having a side wall extending around an outer circumference of the container;
a sleeve (10) that is sufficiently flexible to be wrapped around the side wall of the container (4) and to conform to the outer circumference of the side wall of the container (4), at least one pair of fixing devices (12) on the sleeve (10) and being releasably engageable with one another, the sleeve (10) and the fixing devices (12) being dimensioned to enable the fixing devices (12) of the at least one pair to be releasably engaged with one another for holding the sleeve (10) wrapped around the side wall of the container (4), the sleeve (10) further including:
a heating region (6) configured for contacting the first outer circumferential area of the container (4), and a cooling region (8) configured for contacting the second outer circumferential area of the container (4), the heating region (6) and the cooling region (8) being spatially separated from one another,
at least one heating element (6a, 6b, 6c) disposed entirely and exclusively in the heating region (6) of the sleeve (10) for contacting a first outer circumferential area along the outer circumference of the container (4),
at least one cooling element (8a) disposed entirely and exclusively in the cooling region of the sleeve (10) so that the heating region (6) of the sleeve (10) has no cooling element and so that the cooling region of the sleeve (10) has no heating element, and
a cover covering at least parts of the at least one heating region element (6a, 6b, 6c) and the at least one cooling region element (8a), the cover including an inner layer disposed to face the container (4) and an outer layer disposed to face away from the container, the inner layer being formed from a material that has higher thermal conductivity than the outer layer,
wherein the sleeve (10) can be transferred from an open position to an arrangement position by flexible deformation of the sleeve (10), and
wherein the sleeve (10), in the arrangement position, is arranged on the side wall of the container (4) in a form-fitting manner, at least in some regions, so that the heating region (6) is thermally contacted with the first outer circumferential area of the container (4) without contacting the second outer circumferential area of the container (4) and so that the cooling region (8) is thermally contacted with the second outer circumferential area of the container (4) without contacting the first outer circumferential area of the container (4) such that the temperature of the container (4) can be controlled by the at least one heating element (6a, 6b, 6c) and the at least one cooling element (8a) for establishing the temperature gradient between the first and second outer circumferential areas of the container (4) for controlling the chemical reaction or the biological process in the container (4).

13. The temperature control device of claim 12, wherein the sleeve (10) has a flexible bending region (10a) and an opening region (10b), the opening region (10b) being defined by first and second edges, the heating region (6) extending from the flexible bending region (10a) and the first edge of the opening region (10b) and the cooling region (8) extending from the flexible bending region (10a) to the second edge of the opening region (10b).

* * * * *